US009749873B1

(12) United States Patent
Chang et al.

(10) Patent No.: US 9,749,873 B1
(45) Date of Patent: Aug. 29, 2017

(54) ESTIMATION DEVICES AND METHODS FOR ESTIMATING COMMUNICATION QUALITY OF WIRELESS NETWORK AND METHOD FOR INSTALLING METERS THEREOF

(71) Applicant: Industrial Technology Research Institute, Hsinchu (TW)

(72) Inventors: Shih-Ying Chang, Nantou (TW); Yan-Hao Huang, Changhua (TW); Ping-Hai Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/373,824

(22) Filed: Dec. 9, 2016

(30) Foreign Application Priority Data

Dec. 6, 2016 (TW) .............................. 105140213 A

(51) Int. Cl.
| | |
|---|---|
| *H04W 4/02* | (2009.01) |
| *H04W 16/22* | (2009.01) |
| *H04W 64/00* | (2009.01) |
| *H04B 17/309* | (2015.01) |
| *G01D 4/00* | (2006.01) |
| *G01D 18/00* | (2006.01) |
| *H04W 84/18* | (2009.01) |

(52) U.S. Cl.
CPC .......... *H04W 16/225* (2013.01); *G01D 4/004* (2013.01); *G01D 18/00* (2013.01); *H04B 17/309* (2015.01); *H04W 64/003* (2013.01); *H04W 84/18* (2013.01)

(58) Field of Classification Search
CPC ....... H04W 4/02; H04W 4/021; H04W 64/00; H04W 4/025; H04W 4/04; H04W 64/003; H04W 84/18
USPC .......... 455/500, 517, 67.11, 423–425, 422.1, 455/403, 456.1–457, 404.1, 404.2, 455/414.1–414.4, 405, 426.1, 426.2, 445, 455/412.2, 508, 466; 370/329, 252, 338, 370/253, 332
See application file for complete search history.

(56) References Cited

U.S. PATENT DOCUMENTS

2010/0289652 A1* 11/2010 Javey ....................... H04Q 9/00
340/605

* cited by examiner

*Primary Examiner* — Keith Ferguson
(74) *Attorney, Agent, or Firm* — Birch, Stewart, Kolasch & Birch, LLP

(57) ABSTRACT

A method for estimating communication quality of a wireless network applied to an estimation device having a storage device and a processor is provided. The method includes the steps of: providing coordinate information of a plurality of nodes and at least two kinds of map data; associating the coordinate information of the nodes with the map data to map the nodes to the corresponding positions of the maps; extracting spatial feature data between any two nodes from the associated map data, wherein the spatial feature data include spatial distribution data and spatial attribute data; selecting one of a plurality of path loss models according to the spatial feature data between the two nodes and estimating a pass loss using the selected path loss model, thereby estimating the communication quality between the two nodes.

20 Claims, 9 Drawing Sheets

US 9,749,873 B1

ESTIMATION DEVICES AND METHODS FOR ESTIMATING COMMUNICATION QUALITY OF WIRELESS NETWORK AND METHOD FOR INSTALLING METERS THEREOF

CROSS REFERENCE TO RELATED APPLICATION

This non-provisional application claims the benefit under 35 U.S.C. §119(a) to patent application Ser. No. 10/514, 0213, filed in Taiwan on Dec. 6, 2016, which is hereby expressly incorporated by reference into the present application.

TECHNICAL FIELD

The technical field relates to estimation devices and associated methods for quality estimation thereof, and more particularly to estimation devices of wireless network and related methods for estimating communication quality of wireless network and electricity meter installation methods thereof.

BACKGROUND

Network planning tools can speed up the overall network deployment and performance tuning, in addition to speeding up the deployment speed, but also significantly reduce the cost of deployment. With the progress of communication technology and the popularity of communication equipment, network planning of wireless network is more and more important. Wireless mesh network technology is one of popular wireless network architectures. The wireless mesh network is a communication network made up of radio mesh nodes organized in a mesh topology, which uses mesh network topology technology, wherein the nodes within the mesh network will automatically establish a wireless ad-hoc network and uses the multi-hop feature of the wireless ad-hoc network to maintain the connectivity and reliability of its mesh network. It is mainly used in smart grid, Internet of things and so on. However, any two nodes in the wireless mesh network usually have short communication distance and poor penetration, so the spatial feature between two nodes is an important factor in determining the communication quality. Currently, there is no complete network planning tool for wireless mesh network to calculate the spatial feature between two nodes. Therefore, deployment and test of the nodes need to rely on the observation of space in the field or from map data to obtain the spatial features between nodes. However, this approach uses a great deal of manpower and time, and no uniform quantification standard can be provided.

SUMMARY

Estimation devices of wireless network and related methods for estimating communication quality of wireless network and electricity meter installation methods are provided.

In an exemplary embodiment, a method for estimating communication quality of a wireless network applied to an estimation device comprising a storage device and a processor is provided, wherein the wireless network includes a plurality of nodes. The method comprises the steps of: providing coordinate information of the nodes and at least two types of map data; associating the coordinate information of the nodes with the at least two types of map data to map the nodes to the corresponding positions of the at least two types of map data; extracting spatial feature data between a first node and a second node of the nodes from the associated map data, wherein the spatial feature data includes spatial distribution data and spatial attribute data, the spatial distribution data representing distribution data for buildings and/or lands within spaces between the first node and the second node, the spatial attribute data representing land usage categories and/or classifications corresponding to the distribution data for buildings and/or lands; selecting one of a plurality of path loss models according to the spatial feature data between the first and second nodes and estimating a pass loss between the first and second nodes using the selected path loss model; and estimating the communication quality between the first and second nodes according to the estimated pass loss between the first and second nodes.

Another exemplary embodiment of an estimation device for estimating communication quality of a wireless network includes a storage device and a processor, wherein the wireless network includes a plurality of nodes. The storage device stores coordinate information of the nodes and at least first map data and second map data. The processor is coupled to the storage device for obtaining the coordinate information of the nodes, the first map data and the second map data, associating the coordinate information of the nodes with the first and second map data to map the nodes to the corresponding positions of the first and second map data, extracting spatial feature data between a first node and a second node of the nodes from the associated map data, wherein the spatial feature data includes spatial distribution data and spatial attribute data, the spatial distribution data representing distribution data for buildings and/or lands within spaces between the first node and the second node, the spatial attribute data representing land usage categories and/or classifications corresponding to the distribution data for buildings and/or lands, selecting one of a plurality of path loss models according to the spatial feature data between the first and second nodes and estimating a pass loss between the first and second nodes using the selected path loss model, and estimating the communication quality between the first and second nodes according to the estimated pass loss between the first and second nodes.

In yet another exemplary embodiment, an electricity meter installation method for installing a plurality of electricity meters in a wireless network is provided. The electricity meter installation method comprises the step of: providing coordinate information of the electricity meters and at least two types of map data; associating the coordinate information of the electricity meters with the at least two types of map data to map the electricity meters to the corresponding position of the at least two types of map data; extracting spatial feature data between a first electricity meter and a second electricity meter of the electricity meters from the associated data, wherein the spatial feature data includes spatial distribution data and spatial attribute data, the spatial distribution data representing distribution data for buildings and/or lands within spaces between the first electricity meter and the second electricity meter, the spatial attribute data representing land usage categories and/or classifications corresponding to the distribution data for buildings and/or lands; selecting one of a plurality of path loss models based on the spatial feature data between the first electricity meter and the second electricity meter to use the selected path loss model to estimate a path loss between the first electricity meter and the electricity meter; and estimating communication quality and connectivity between the first electricity meter and the second electricity meter based on the estimated path loss between the first electricity meter and the second electricity meter and determining whether to install the first electricity meter and the second electricity meter on the wireless network based on the communication quality and connectivity estimation result.

Methods disclosed above may be practiced by the estimation device which are hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The application will become more fully understood by referring to the following detailed description with reference to the accompanying drawings, wherein.

DETAILED DESCRIPTION OF EMBODIMENTS

Figure 1:
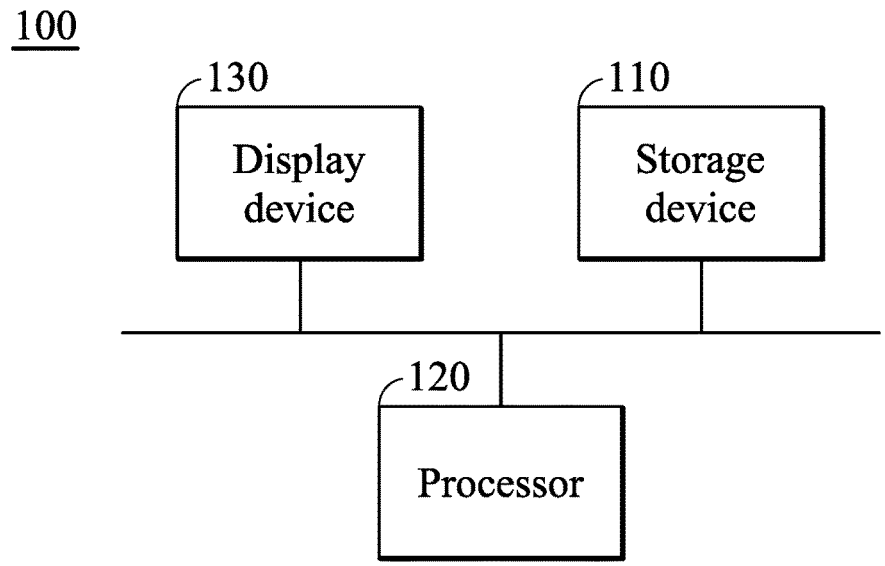
FIG. 1 is a schematic diagram of a hardware structure of an estimation device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that the embodiments may be realized in software, hardware, firmware, or any combination thereof.

Embodiments of the application provide estimation devices and related methods for estimating communication quality of a wireless network thereof, which can obtain spatial distribution and features/attributes between any two nodes of a wireless network from a plurality of maps or map data and use the spatial feature to apply an appropriate path loss model to precisely estimate a communication quality between two nodes by taking into account for the influence of various obstacles on the attenuation of radio frequency (RF) signals between two nodes, thus improving the network planning efficiency of the wireless network.

FIG. 1 is a schematic diagram of a hardware structure of an estimation device 100 according to an embodiment. In some embodiments, the estimation device 100 may be a desktop computer, an All-In-One (AIO) computer, a notebook, a notebook with a touch panel, or a portable device or handheld device, such as a Personal digital assistant (PDA), a smartphone, a tablet, a mobile phone, a mobile Internet device (MID), a laptop computer, a car-used computer, a digital camera, a digital media player, a gaming console or any type of mobile computing device, or any other type of mobile Internet device. However, it is understood that the application is not limited thereto.

As shown in FIG. 1, the hardware architecture of the estimation device 100 includes at least a storage device 110, a processor 120, and a display device 130. The storage device 110 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as intermediate data generated during the calculation process and the execution result information and so on. The storage device 110 may also store instruction sets and/or program code modules that can be executed by the processor 120. Generally speaking, program code modules contain routines, programs, objects, components, and so on. The storage device 110 may further store various items of data required for the operation, such as two or more map data, a plurality of default path loss models, one or more classification patterns and so on. It should be noted that detail descriptions of the specific map data, default path loss models, and the classification patterns will be described in the following embodiments.

The processor 120 which is coupled to the storage device 110 and the display device 130, which may be used to load and execute a series of instructions and/or program codes from the storage device 110 to control the operations of the storage device 110 and the display device 130 to perform the method for estimating communication quality of a wireless network of the application, including the steps of: obtaining the spatial distribution and spatial attribute features of any two nodes of the wireless network based on the coordinate information of each node and the map data and estimating the communication quality between the two nodes based on the spatial distribution and spatial attribute features of the two nodes of the wireless network, the details of which will be described more in the following paragraphs. The processor 120 may be a Central Processing Unit (CPU), Micro-Control Unit (MCU), Graphics Processing Unit (GPU), Digital Signal Processor (DSP), or the like, which provides the function of data analysis, processing and computing.

The display device 130 can display related data, such as texts, figures, interfaces, and/or information such as displaying or presenting operation results. The display device 130 may be configured to present a screen of the results, such as a Liquid-Crystal Display (LCD). It should be understood that, in some embodiments, the display device 130 may be a screen integrated with a touch-sensitive device (not shown). The touch-sensitive device has a touch-sensitive surface comprising sensors in at least one dimension to detect contact and movement of at least one input tool, such as a pen/stylus or finger near or on the touch-sensitive surface. Accordingly, users are able to input commands or signals via the display device 130.

Although they are not shown, the estimation device 100 may further comprise other functional units, such as an Input/Output (I/O) device (e.g., button, keyboard, mouse, etc.), a communication device or the like, and the application is not limited thereto.

Figure 2:
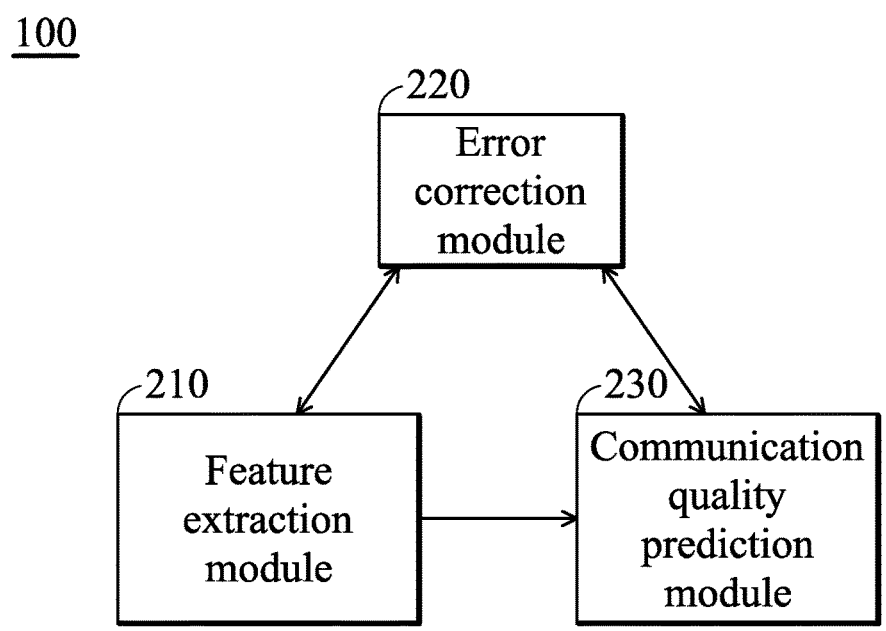
FIG. 2 is a schematic diagram of a software structure of the estimation device according to an embodiment.

FIG. 2 is a schematic diagram of a software structure of the estimation device 100 according to an embodiment. The software architecture of the estimation device 100 includes a feature extraction module 210, an error correction module 220, and a communication quality prediction module 230. The feature extraction module 210, the error correction module 220 and the communication quality prediction module 230 can be stored in the storage device 110 (e.g., memory) of the estimation device 100 and can be loaded and executed at an appropriate timing by the processor 120 of the estimation device 100 to perform the method for estimating the communication quality of the wireless network of the present application.

More particularly, the processor 120 may perform the method for estimating the communication quality of the wireless network of the present application by controlling the operation of the feature extraction module 210, the error correction module 220 and the communication quality prediction module 230. Specifically, the processor 120 may map the node coordinates of the wireless network to the map by the feature extraction module 210, analyze the spatial features between any two nodes within an upper limit of the communication range through an image analysis technique to generate spatial feature data, corrects the positioning error by the error correction module 220 and outputs a matrix representing the pass loss between the two nodes from the start point to the end point by applying the obtained spatial features to a suitable path loss model to estimate the overall path loss between the two nodes and estimate communication quality corresponding thereto by the communication quality prediction module 230.

It should be understood that each of the elements or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods.

Figure 3:
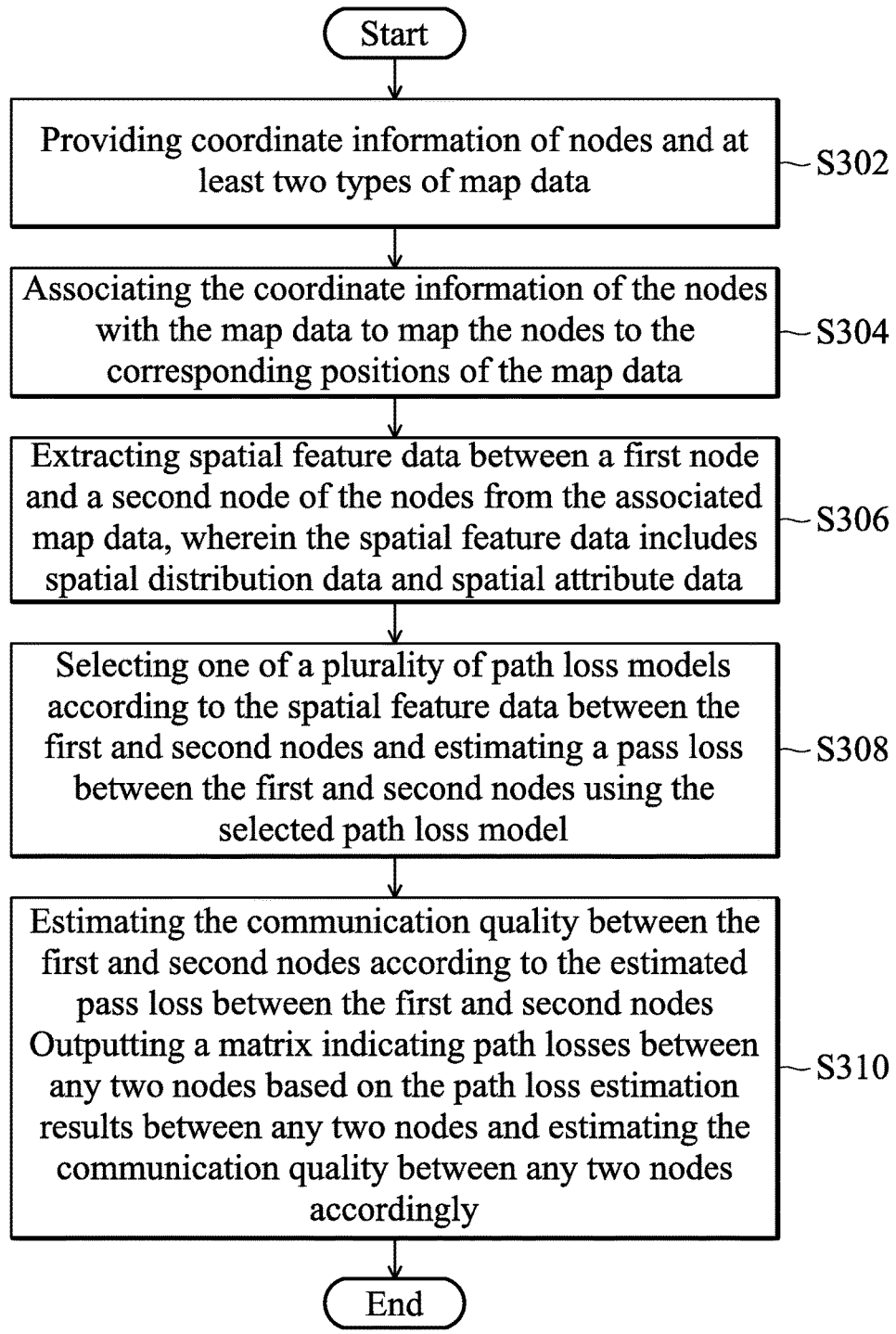
FIG. 3 is a flowchart of a method for estimating the communication quality of the wireless network according to an embodiment.

FIG. 3 is a flowchart of a method for estimating the communication quality of the wireless network according to an embodiment of the application. Please refer together with FIG. 1, FIG. 2 and FIG. 3. The method for estimating the communication quality of the wireless network of the application may be applied to an estimation device, such as the estimation device 100 as shown in FIG. 1 and performed by the processor 120. In this embodiment, the wireless network is a wireless mesh network, but the application is not limited thereto.

Figure 4A:
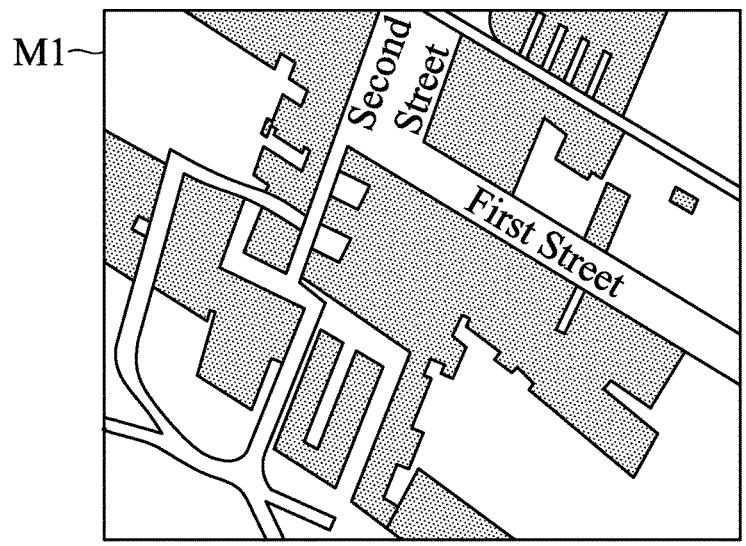
FIGS. 4A and 4B are schematic diagram illustrating exemplary embodiments of two types of map data.
Figure 4B:
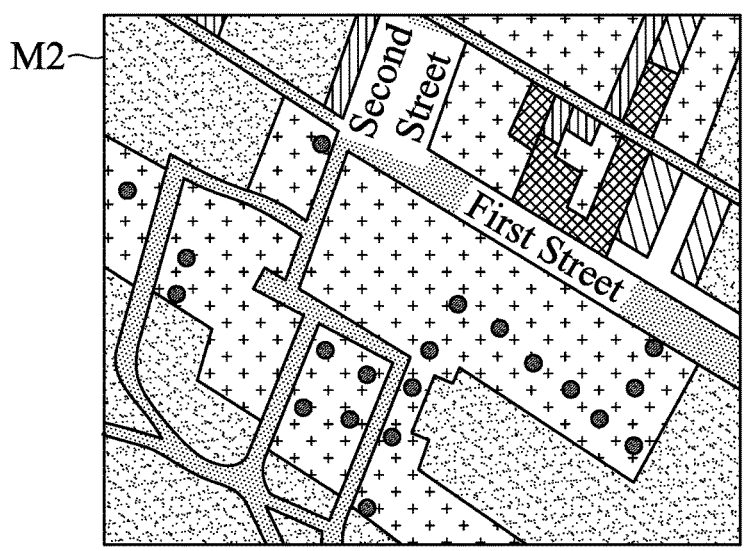

First, in step S302, coordinate information of each node and at least two types of map data are provided. These map data may be any open-source maps, which may be two or more different map data of the same type. FIGS. 4A and 4B are schematic diagram illustrating exemplary embodiments of two types of map data of the application. In this embodiment, the map data M1 shown in FIG. 4A is a road map containing information about appearances of building surfaces, such as a general electronic map, a Google map and so on. The map data M2 shown in FIG. 4B is a land use/land cover (LULC) map including a number of land usage classifications and a number of land usage categories of the building, such as a land use survey map for country land usage and so on. The coordinate information of each node may be a GPS coordinate containing latitude and longitude to indicate the location of the node. Generally speaking, the map M2 may further include a land-usage-classification color table (not shown), so reference may be made to the color codes in the land-usage-classification color table according to the color of the building or land (indicated by gray scale in the FIG. 4B) to obtain the land usage classification and land usage category of each building. In one embodiment, the coordinate information of each node and at least two types of map data may be stored in the storage device 110, which may then be read by the processor 120 from the storage device 110.

Figure 4C:
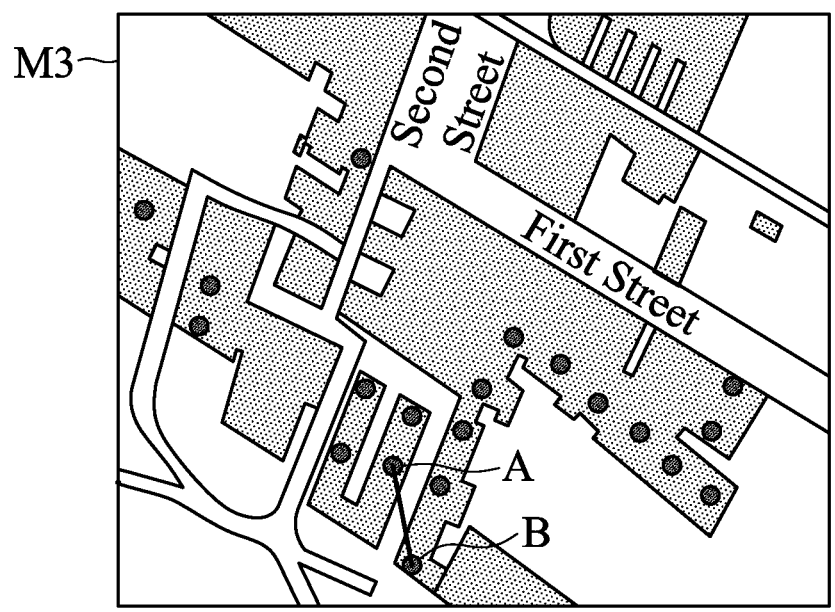
FIG. 4C is a schematic diagram illustrating an exemplary embodiment of the result of the map data integration.

Next, in step S304, the processor 120 associates the coordinate information of all the nodes with all of the map data to map the nodes to the corresponding positions of the map data. Specifically, the processor 120 may map all the nodes of the wireless network to their corresponding locations in the map data according to their coordinate information to establish an association with each other by the feature extraction module 210. Map data generated by mapping the nodes of the wireless network to their corresponding positions in the map data according to their coordinate information is also referred to as an associated map data. Referring to FIG. 4C, which is a schematic diagram illustrating an exemplary embodiment of the result of the map data integration of the application. As shown in FIG. 4C, each node in the associated map data M3 is being marked/pointed in the corresponding position of the map data M3.

In some embodiments, as the coordinates of a node may fall within a building, there may have the positioning error in which there are not actually any obstacles between adjacent nodes, whereas in the map it appears that these two nodes are obstructed by obstacles. For example, one possible positioning error is that there may be partial of the building in the front and rear caused by positioning the nodes within the building, and another possible positioning error is that there are buildings between the nodes in the same row of buildings caused by positioning the nodes within the building. In the case of a smart grid, for example, after the power company gives the user address of the electricity meter, the GPS coordinates of which obtained from counter-checking its address are usually in the center of the house. Some services provide coordinates close to the location of the doorplate of the house, but the location of the outdoor electricity meter is usually near the location of the doorplate. Accordingly, there may be errors in the analysis, for example: for two adjacent electricity meters, it may look like the two meters were obstructed by obstacles in the map even if there is no obstacle between each other. Therefore, the present application proposes a point-based error correction mechanism to solve the problem of spatial feature extraction error caused by analytical error (also known as positioning error).

Figure 5:
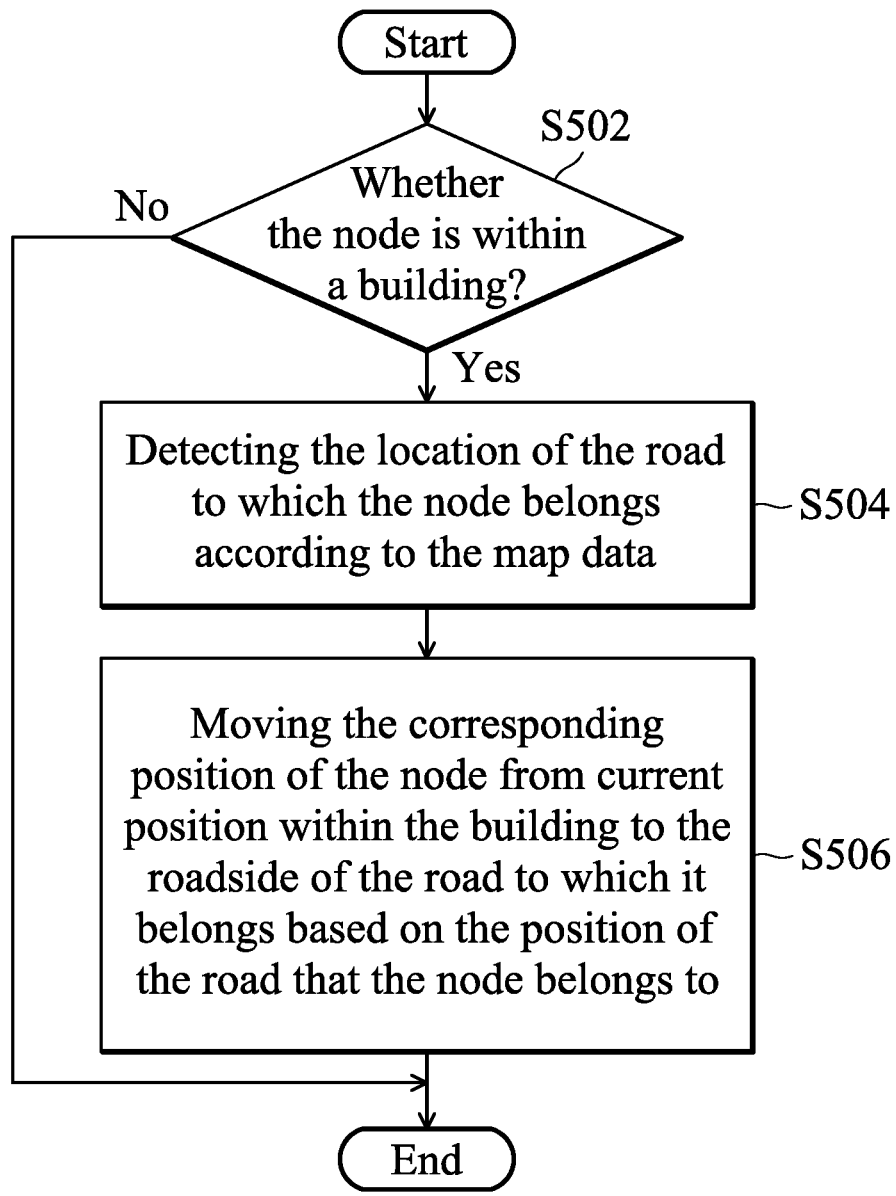
FIG. 5 is a flowchart of an error correction method according to an embodiment.

FIG. 5 is a flowchart of an error correction method according to an embodiment of the application. The error correction method of the application may be applied to the estimation device 100 as shown in FIG. 1 and performed by the processor 120, wherein the processor 120 may load and perform the error correction method by the error correction module 220. It should be understood that the error correction method described above can be used for correcting the positioning error of each node.

First, in step S502, the processor 120 analyzes whether the node is within the building based on the spatial attribute data. More particularly, the processor 120 locates the node's location on the LULC map. As the GPS coordinates of the node and the coordinate system of the LULC map can be obtained, the location of the node on the map data can be determined and whether the location of this node is in the road, farmland or building can be further identified by the spatial attribute data.

If the node is not within the building (No in step S502), it means that there is no positioning error problem, and thus no correction is required. On the other hand, if the node is within the building (Yes in step S502), the correction processing of step S504 is further performed to move the node out of the building.

In step S504, the processor 120 detects the location/position of the road to which the node belongs according to the map data. Specifically, the actual position of the node is usually on the side close to the roadside, so it is necessary to first identify which side of the road the node belongs to. For example, the road closest to the node can be regarded as the road to which the node belongs, or the road to which the node belongs can be determined by analyzing the address of the node and determining the road to which the node belongs by the address number, for example: determining whether the address is of the odd number or of the even number to distinguish the road information corresponding to the node.

When the road to which the node belongs has been analyzed, in step S506, the processor 120 moves the corresponding position of the node from current position within the building to the roadside of the road to which it belongs based on the position of the road that the node belongs to. That is, the corresponding position of the node is moved in the direction perpendicular to the roadside of the road.

Therefore, with the error correction mechanism described above, the position of each node can be moved to its closet roadside to be out of the building by the image analysis technique, thereby reducing the analysis error caused by associating the coordinate information of each node with the map data.

Referring again to FIG. 3, after all of the nodes have been mapped to the corresponding positions within the map data, in step S306, the processor 120 extracts the spatial feature data between any two nodes from the associated map data. The spatial feature data includes spatial distribution data and spatial attribute data. In some embodiments, the step of extracting the spatial feature data between the two nodes from the map data may include at least the step of extracting the spatial distribution data and the spatial attribute data and the step of combining the spatial distribution data and the spatial attribute data to generate spatial feature data. Specifically, the attribute and spatial feature extraction can be performed by the processor 120, through the feature extraction module 210, using image analysis techniques to analyze the pixels of the map data located between the two nodes and the representative meanings of these pixels and obtain the spatial feature data of the two nodes, which can be used to describe spatial distribution and spatial attributes created between the two nodes, from the two map data, wherein the spatial feature data includes spatial distribution data and spatial attribute data. Generally, any two nodes may be separated by buildings, roads or other different spatial distribution, and the usage category of the building may be residential or factory. The spatial distribution data is used to represent this spatial distribution, and the spatial attribute data represents the land usage category and/or classification corresponding to the distribution data (such as lands, buildings and others). For example, the spatial distribution data between two nodes represents the distribution data, such as lands, buildings and others, for the spaces between the two nodes (e.g., the space is a land or a building and a distance between any two spaces), and the spatial attribute data indicates the land usage category and/or classification corresponding to the distribution data (e.g., lands, buildings and others) (e.g., whether the land is an unused/open land, a road, a forest or a fishpond, and the building belongs to the factory or pure residential and so on). For example, referring to FIGS. 4A and 4B, the map data M1 provides at least the spatial distribution data indicating that each land within the spaces belongs to a building or a land and the map data M2 at least provides the spatial attribute data indicating the type of a building (e.g., a house or a factory, etc.) or the type of a land (e.g., a road or a farmland, etc.). Therefore, the spatial features between two nodes can be obtained from the two types of map data mentioned above, which can represent the spatial distribution of the buildings and lands between the two nodes A and B (including the length of buildings being passed through/the length of roads being passed through) as well as respective spatial attributes, as shown in FIG. 6.

Figure 6:
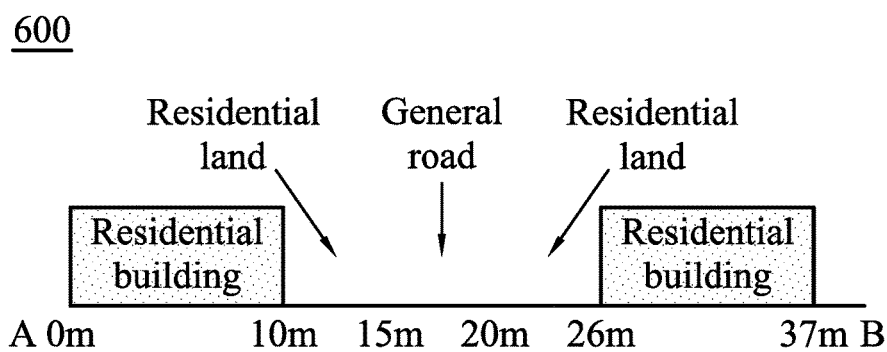
FIG. 6 is a schematic diagram illustrating an exemplary embodiment of the spatial feature data.

FIG. 6 is a schematic diagram illustrating an exemplary embodiment of the spatial feature data of the application. As shown in FIG. 6, the spatial feature data 600 represents the spatial distribution, distance and spatial attributes between two nodes A and B, wherein a distance between the node A and the node B is 37 meters, and spaces between these two nodes include two residential buildings, residential land and general road, the specific distribution and distance of which are as shown. Based on the spatial feature data 600, a ratio for buildings and unused lands between the two nodes can easily be determined, which can further be used as a reference for the subsequent selection of path loss model.

Taking the spatial feature extraction of the LULC map as an example, it may include at least the following steps: reading a map of a region where the nodes are located in the LULC map; identifying the pixel coordinates of the nodes; confirming all land usage categories between the nodes; and calculating the distances between the land usage categories based on latitude and longitude information so as to obtain the spatial feature data between the nodes.

In some embodiments, the present application also provides a link-based correction that is based on a connection between two nodes to correct the positioning error with reference to the aforementioned spatial feature data for each node connection. To be more specific, the processor 120 may analyze the spatial features between the two nodes in advance, design a plurality of error correction samples that can correct possible positioning errors, and then apply the corresponding error correction samples based on the spatial features between any two nodes to correct the aforementioned positioning error of the positions of a connection between the two nodes.

Figure 7:
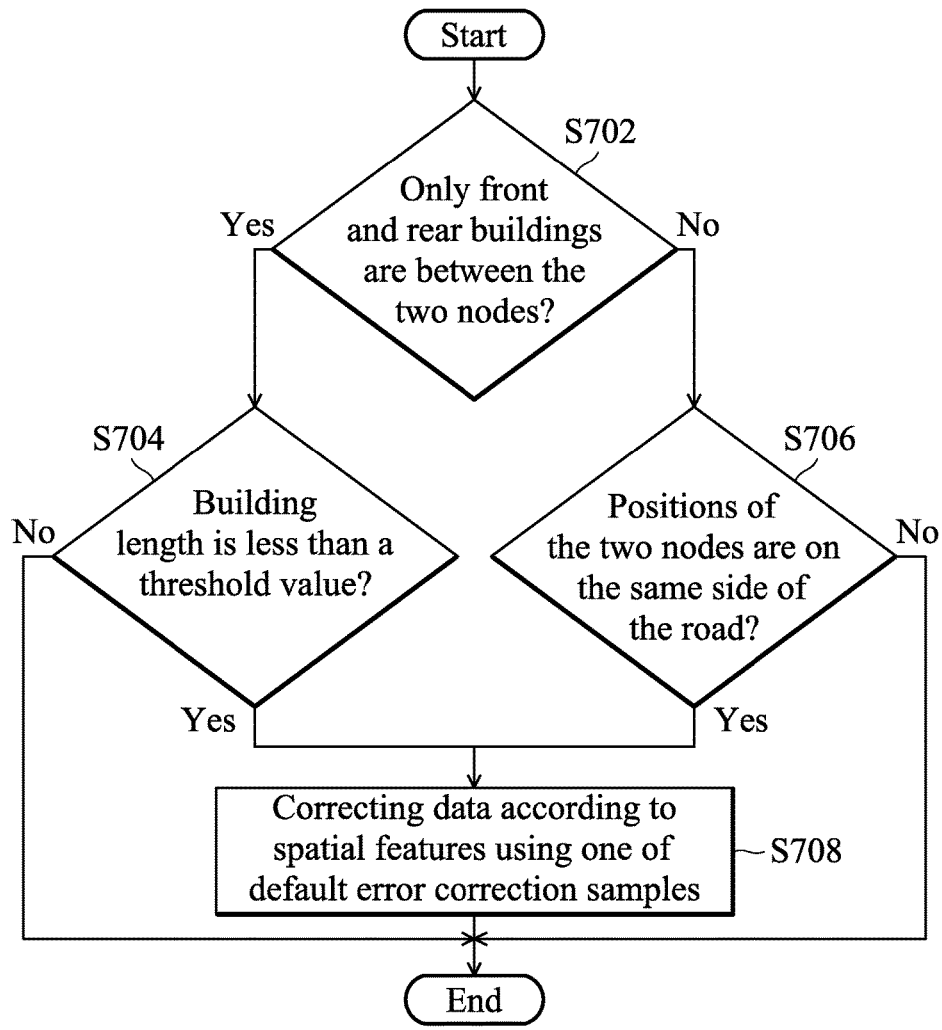
FIG. 7 is a flowchart of an error correction method according to another embodiment.

FIG. 7 is a flowchart of an error correction method according to another embodiment of the application. The error correction method of the application may be applied to the estimation device 100 as shown in FIG. 1 and performed by the processor 120, wherein the processor 120 may load and perform the error correction method by the error correction module 220.

First, in step S702, the processor 120 determines whether or not there are only front and rear buildings between the two nodes based on the spatial features between the two nodes. If there are only front and rear buildings between the two nodes, step S704 is further performed. In step S704, the processor 120 determines whether the building length is less than a threshold value (e.g., 5 meters). When the building length is less than the threshold value (Yes in step S704), it means that correction is required, and then, in step S708, the processor 120 can correct the data according to its spatial features using one of default error correction samples to correct the data to a specified spatial feature.

If there are more than front and back buildings between the two nodes (No in step S702), the processor 120 then proceeds to step S706. In step S706, the processor 120 determines whether the positions of the two nodes are on the same side of the road. When the positions of the two nodes are on the same side of the road (Yes in step S706), it indicates that correction is required, and then, in step S708, the processor 120 can correct the data based on its spatial features using one of the default error correction samples to correct the data to a specified spatial feature. When the building length between the two nodes is greater than or equal to the threshold value (No in step S704) or if the positions of the two nodes are not on the same side of the road (No in step S706), no correction is required and thus the correction process is ended.

After the spatial feature data has been extracted in step S306, in step S308, the processor 120 further selects one of a plurality of path loss models based on the spatial feature data between any two nodes by the communication quality prediction module 230 to estimate a path loss between the two nodes using the selected path loss model. More particularly, the storage device 110 may store multiple path loss models and the processor 120 may establish one or more classification patterns of the spatial features corresponding to the path loss model used, each of the classification patterns including at least one or more classification criteria. The processor 120 then selects suitable path loss model based on the spatial feature data between the two nodes and one or more classification criteria in the classification patterns through the distances and attributes of the buildings and the lands represented by the spatial features so as to analyze and calculate path loss estimation results between any two nodes.

Figure 8:
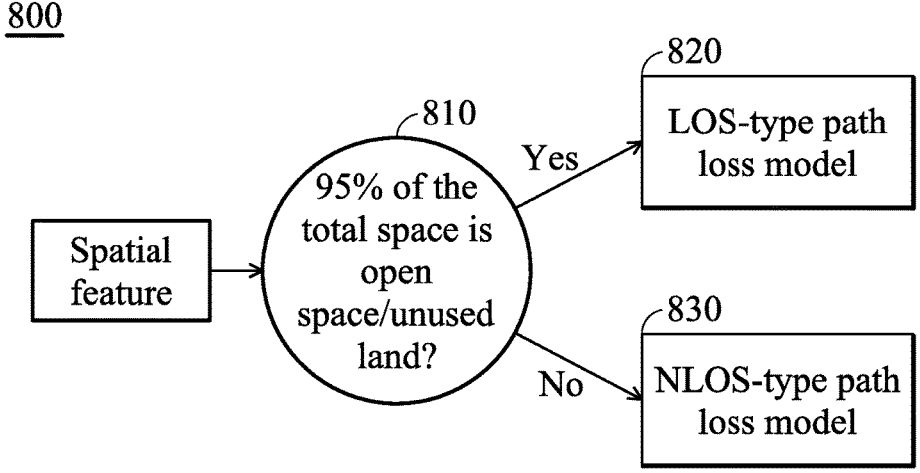
FIG. 8 is a schematic diagram illustrating an exemplary embodiment of the classification pattern.

FIG. 8 is a schematic diagram illustrating an exemplary embodiment of the classification pattern of the application. As shown in FIG. 8, the classification pattern 800 is used to classify that whether the path loss model 820 or the path loss model 830 is suitable for specific spatial feature data according to the classification criterion 810. For example, the path loss model 820 can be a line of sight (LOS)-type path loss model and the path loss model 830 can be a non-line of sight (NLOS)-type path loss model, and the application is not limited thereto. In other words, LOS indicates that there are no obstructions (e.g., a building) between the two nodes, and NLOS indicates that there is an obstruction between the two nodes. In this embodiment, the classification criterion 810 can be used to select the path loss model 820 or the path loss model 830 for pass loss calculation according to the proportion of the open spaces/unused lands between the two nodes. When the spatial feature data between a node C and a node D shows that 96% of the total space in the space between them is open space/unused land, the classification criterion 810 is satisfied, and thus the corresponding path loss model being selected is the path loss model 820. Contrarily, when the spatial feature data shows that only 50% of the total space in the space between the nodes C and D is open space, the classification criterion 810 is not satisfied and thus the corresponding path loss model being selected is the path loss model 830.

It should be understood that the number of the classification criteria and the number of path loss models shown in the classification pattern 800 are merely for illustration purpose and the application is not limited thereto. In other embodiments, the path loss model 820 and the path loss model 830 may further include a variety of indoor and outdoor path loss models so that there can be classification patterns with more classification criteria to subdivide the path loss model 820 and the path loss model 830, for example, the spatial feature data between two nodes belongs to which type of LOS-type models (e.g., whether it passes through a road, a forest or others) or it belongs to which type of NLOS-type models (e.g., the spacing or the type of the building between the two nodes). In other words, desired classification patterns can be designed according to the characteristics of the path loss models to be used.

After classifying the path loss models corresponding to the spatial features according to the classification patterns, the processor 120 may further estimate the signal attenuation caused by passing through these spaces using the corresponding path loss model.

It should be noted that different spatial features may have different path loss models and the path loss values of different path loss models may have different estimation results with different distances. Therefore, the processor 120 can select a suitable path loss model according to the spatial attribute characteristics between the two nodes to accurately estimate the signal attenuation of the two nodes so as to further estimate the communication quality there between.

After obtaining the path loss estimation result between any two nodes, as in step S310, the processor 120 further outputs, by the communication quality prediction module 230, a matrix indicating path losses between any two nodes based on the path loss estimation results between any two nodes, and then estimates the communication quality between any two nodes accordingly. Specifically, the processor 120 can apply the distance and spatial attributes to the corresponding path loss model to estimate the signal attenuation between any two nodes A and B to determine the communication quality between the nodes A and B.

Therefore, according to the spatial feature data of the present application, a more matched path loss model can be used to estimate path loss according to different spatial attribute features, thus effectively improving the accuracy of prediction. Thereafter, the processor 120 can carry on the subsequent planning according to the communication quality between the two nodes of A and B. For example, according to the communication quality between the two nodes A and B to determine whether the two nodes can be connected together to plan suitable installation locations for network nodes of the wireless network and so on. In some embodiments, the communication quality prediction module 230 may further estimate other communication quality indicators such as connectivity and/or data rate, etc., from the path loss estimation results and use these communication quality indicators together with the path loss estimation results for communication quality estimation.

In some embodiments, since the present application employs two different map data of the same type, the two map data may be of different fineness or version, such that there may be a conflict point occurred when the map data are integrated. Therefore, the present application further provides a mechanism for correcting the conflict occurred during integrating the two map data. More particularly, the processor 120 may implement the mechanism for correcting the conflict occurred during merging the two map data by the feature extraction module 210. First, the processor 120 defines the association data of the two map attributes according to the number of attributes of the two map data. For example, assume that map M1 has two attribute data, i.e., "building" A1 and "land" A2, and map M2 has two attributes "house" B1 and "factory" B2 corresponding to attribute "building" A1 and two attributes "road" B3 and "fishpond" B4 corresponding to attribute "land" A2. The association data for the map attributes of the two map data may include combinations of <M1.A1, M2.B1>, <M1.A1, M2.B2>, <M1.A2, M2.B3>, and <M1.A2, M2.B4>, and so on.

Next, the processor 120 detects whether there is a conflicting node corresponding to conflicting data based on the association data. For example, in the above example, since there is no combination of <M1.A1, M2.B3> or <M1.A2, M2.B1> in the association data, it can be seen that the data can be regarded as conflicting data.

When the conflicting data has been detected, the processor 120 performs a conflict correction on the conflicting points corresponding to the conflicting data. In some embodiments, the processor 120 may make corrections in accordance with the priorities of each map and a correction criterion. For example, assume that the priority of map M1 is greater than the priority of map M2 and the corresponding map attribute "M2" of "M1.A2" is more than one, the attribute "M1.A2" will be replaced by the attribute "M2.A2". That is, <M1.A2, B. B1> is being corrected to be <M1.A2, M2.A2 (blank attribute)>. If the priority of the map M1 is less than the priority of the map M2, "M1.A2" will be changed to "M1.A1", that is, modifying <M1.A2, M2.B1> to <M1.A1, M2.B1>.

For explanation, specific communication quality estimation results are illustrated as actual implementation examples in the following embodiments, and those skilled in the art will understand that the present application is not limited thereto.

Figure 9:
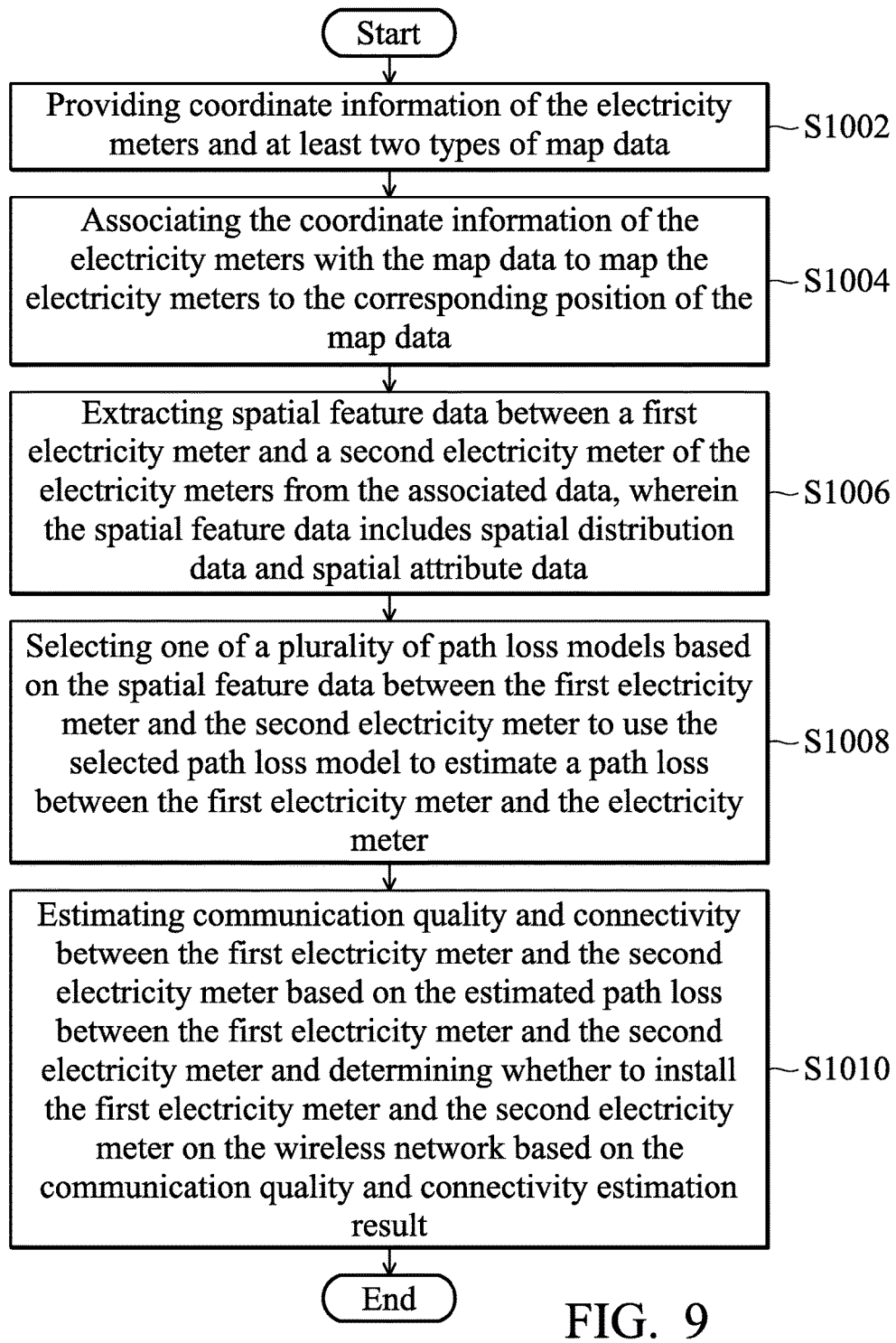
FIG. 9 is a flowchart of an electricity meter installation method according to an embodiment.

FIG. 9 is a flowchart of an electricity meter installation method for installing a plurality of electricity meters in a wireless mesh network according to an embodiment of the application. In other words, the installation position/location of each electricity meter must be in the communication range of the wireless mesh network and these electricity meters can constitute a smart grid. Please refer together with FIG. 1, FIG. 2, FIG. 3 and FIG. 10. The electricity meter installation method of the application may be applied to an estimation device, such as the estimation device 100 as shown in FIG. 1 and performed by the processor 120. The electricity meter installation method may comprise the steps of: providing coordinate information of the electricity meters and at least two types of map data, wherein the map data provides at least a spatial distribution data and a spatial attribute data (step S1002); associating the coordinate information of the electricity meters with the map data to map the electricity meters to the corresponding position of the map data (step S1004); extracting spatial feature data between a first electricity meter and a second electricity meter among the electricity meters from the associated data, wherein the spatial feature data includes spatial distribution data and spatial attribute data, and the feature distribution data represents the distribution data such as the lands and the buildings within the space between the first electricity meter and the second electricity meter and the spatial attribute data indicates the land usage category and/or classification corresponding to the distribution data such as the lands and the buildings, etc. (step S1006); selecting one of a plurality of path loss models based on the spatial feature data between the first electricity meter and the second electricity meter to use the selected path loss model to estimate a path loss between the first electricity meter and the electricity meter (step S1008); and estimating communication quality and connectivity between the first electricity meter and the second electricity meter based on the estimated path loss between the first electricity meter and the second electricity meter and determining whether to install the first electricity meter and the second electricity meter on the wireless network based on the communication quality and connectivity estimation result (step S1010). It should be noted that the details of the steps S1002, S1004, S1006, S1008, and S1010 may correspond to the description of steps S302, S304, S306, S308, and S310 in FIG. 3, and details thereof are omitted here for brevity. It should be understood that the first and second electricity meters in this embodiment can be any pair of electricity meters in the electricity meters to be installed.

For example, the coordinate information of each electricity meter in the wireless mesh network and the two types of map information for reference may first be inputted, wherein the coordinate information of each electricity meter is the GPS coordinate converted from the address of each meter's user address. The two types of map data may each include a first map providing the spatial distribution data and a second map providing the spatial attribute data. For example, the first map may be a road map as shown in FIG. 4A, and the second map may be a LULC map as shown in FIG. 4B, which is a map showing the attributes of the lands and the buildings. An embodiment of the LULC map is a land use survey map for country land usage. Then, based on the GPS coordinate of each node and map data, map association for the map data can be established and GPS location correction can be performed by analyzing the position of each node on the map data and correcting the position of the node to a position close to the road location rather than within the building. Note that each node represents one electricity meter. Detailed steps of establishing the map association in accordance with the GPS coordinates of the respective meters and the map data may be referred to step S304 in FIG. 3 and the detailed steps of the GPS location correction may be referred to the error correction steps in FIGS. 5 and 7 and detailed are omitted here.

Thereafter, it is calculated whether or not the distance between the two nodes (i.e., two electricity meters) is within the connection range. Specifically, the upper limit of the connection range may be varied depending on the communication technology and can be the maximum connectable distance under obstructions, for example, one kilometer. If the two nodes being calculated are within the connection range, next set of two nodes will be selected and above steps are repeated.

If the distance between the two nodes is in the connection range, spatial feature extraction and integration is performed to obtain the spatial feature data. For example, spatial features can be established by analyzing the pixel points passing through a line formed by two nodes through image analysis technology. The spatial distribution, such as building or land, between the two nodes can be obtained from the first map data (e.g., road map), and then the buildings and the lands can be added with space attributes or properties, such as roads, factories, pure residential properties and so on, from the second map data (i.e., LULC map).

After the spatial feature data has been obtained, a suitable path loss model is selected to calculate the path loss between the two nodes by using the spatial feature between the two nodes. All steps mentioned above will be repeated until all the two-node connections to be analyzed have been analyzed.

The communication quality and connectivity between any two nodes can then be estimated based on the path loss between the two nodes, thereby knowing the effect of various obstacles on radio-frequency (RF) signal attenuation between the two nodes and further determining the positions for installing the electricity meters. When the communication quality and connectivity between any two electricity meters are better than a given threshold, these two electricity meters can be installed in the wireless mesh network.

Thus, the estimation device and related methods for estimating communication quality of wireless network and electricity meter installation method thereof of the application can obtain the finer spatial distribution and attributes between any two nodes of the wireless network from a plurality of maps at low cost and can use the spatial features of different fields to apply suitable path loss model, so as to consider the impact of various obstacles on radio frequency (RF) signal attenuation between two nodes, thus providing precisely estimation of the communication quality between two nodes and installing the electricity meter in the proper location, thus improving the network planning efficiency of wireless network. Moreover, the error correction method of the application can further correct the positioning error, thus making the estimation more accurate and having a higher accuracy rate than any conventional methods.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the application has been described by way of example and in terms of exemplary embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A method for estimating communication quality of a wireless network applied to an estimation device comprising a storage device and a processor, wherein the wireless network includes a plurality of nodes, the method comprising:
   providing coordinate information of the nodes and at least two types of map data;
   associating the coordinate information of the nodes with the at least two types of map data to map the nodes to the corresponding positions of the at least two types of map data;
   extracting spatial feature data between a first node and a second node of the nodes from the associated map data, wherein the spatial feature data includes spatial distribution data and spatial attribute data, the spatial distribution data representing distribution data for buildings and/or lands within spaces between the first node and the second node, the spatial attribute data representing land usage categories and/or classifications corresponding to the distribution data for buildings and/or lands;
   selecting one of a plurality of path loss models according to the spatial feature data between the first and second nodes and estimating a pass loss between the first and second nodes using the selected path loss model; and
   estimating the communication quality between the first and second nodes according to the estimated pass loss between the first and second nodes.

2. The method as claimed in claim 1, wherein the step of associating the coordinate information of the nodes with the at least two types of map data to map the nodes to the corresponding positions of the at least two types of map data further comprises, for each of the nodes:
   analyzing whether the node is within a building according to the spatial attribute data;
   when the node is within the building, detecting the location of the road to which the node belongs according to the at least two types of map data; and
   moving the corresponding position of the node from the building to the edge of the location of the road to which the node belongs according to the detected location of the road to which the node belongs.

3. The method as claimed in claim 1, wherein a distance between the first and second nodes is within a connection range of the wireless network.

4. The method as claimed in claim 1, wherein the step of extracting spatial feature data between the first node and the second node from the associated map data further comprises:
   extracting the spatial distribution data and the spatial attribute data between the first node and the second node in the associated map data; and
   integrating the spatial distribution data and the spatial attribute data to generate the spatial feature data.

5. The method as claimed in claim 4, wherein the step of integrating the spatial distribution data and the spatial attribute data to generate the spatial feature data further comprises:
   defining a plurality of association data of a plurality of map attributes according to the number of the map attributes for the associated map data;
   detecting whether the at least two types of map data has a conflicting node with conflicting data based on the association data; and
   performing a conflict correction on the conflicting data of the conflicting node when detecting the conflicting node.

6. The method as claimed in claim 4, further comprising:
   providing at least one correction sample corresponding to the spatial feature data; and
   correcting the position of a line formed by the first node and the second node using the at least one correction sample.

7. The method as claimed in claim 1, wherein the step of selecting one of the path loss models according to the spatial feature data between the first and second nodes further comprises:
   establishing at least one classification pattern corresponding to the path loss models, wherein the at least one classification pattern comprises at least one classification criterion; and
   determining the selected path loss model from the path loss models based on the spatial feature data and the at least one classification criterion.

8. The method as claimed in claim 1, wherein the wireless network is a wireless mesh network.

9. The method as claimed in claim 1, wherein the at least two types of map data comprise a road map and a land use land cover map (LULC map).

10. An estimation device for estimating communication quality of a wireless network, wherein the wireless network includes a plurality of nodes, comprising:
- a storage device, storing coordinate information of the nodes and at least first map data and second map data; and
- a processor coupled to the storage device, obtaining the coordinate information of the nodes, the first map data and the second map data, associating the coordinate information of the nodes with the first and second map data to map the nodes to the corresponding positions of the first and second map data, extracting spatial feature data between a first node and a second node of the nodes from the associated map data, wherein the spatial feature data includes spatial distribution data and spatial attribute data, the spatial distribution data representing distribution data for buildings and/or lands within spaces between the first node and the second node, the spatial attribute data representing land usage categories and/or classifications corresponding to the distribution data for buildings and/or lands, selecting one of a plurality of path loss models according to the spatial feature data between the first and second nodes and estimating a pass loss between the first and second nodes using the selected path loss model, and estimating the communication quality between the first and second nodes according to the estimated pass loss between the first and second nodes.

11. The estimation device as claimed in claim 10, wherein the processor further performs the following steps for each of the nodes:
- analyzing whether the node is within a building according to the spatial attribute data;
- when the node is within the building, detecting the location of the road to which the node belongs according to the first and second map data; and
- moving the corresponding position of the node from the building to the edge of the location of the road to which the node belongs according to the detected location of the road to which the node belongs.

12. The estimation device as claimed in claim 10, wherein a distance between the first and second nodes is within a connection range of the wireless network.

13. The estimation device as claimed in claim 10, wherein the processor further extracts the spatial distribution data and the spatial attribute data between the first node and the second node in the associated map data and integrates the spatial distribution data and the spatial attribute data to generate the spatial feature data.

14. The estimation device as claimed in claim 13, wherein the processor further defines a plurality of association data of a plurality of map attributes according to the number of the map attributes for the associated map data, detects whether the first and second map data has a conflicting node with conflicting data based on the association data and performs a conflict correction on the conflicting data of the conflicting node when detecting the conflicting node.

15. The estimation device as claimed in claim 13, wherein the processor further provides at least one correction sample corresponding to the spatial feature data and corrects the position of a line formed by the first node and the second node using the at least one correction sample.

16. The estimation device as claimed in claim 10, wherein the processor further establishes at least one classification pattern corresponding to the path loss models, wherein the at least one classification pattern comprises at least one classification criterion, and determines the selected path loss model from the path loss models based on the spatial feature data and the at least one classification criterion.

17. The estimation device as claimed in claim 10, wherein the wireless network is a wireless mesh network.

18. The estimation device as claimed in claim 10, wherein the first map data is a road map and the second map data is a land use land cover map (LULC map).

19. An electricity meter installation method for installing a plurality of electricity meters in a wireless network, comprising:
- providing coordinate information of the electricity meters and at least two types of map data;
- associating the coordinate information of the electricity meters with the at least two types of map data to map the electricity meters to the corresponding position of the at least two types of map data;
- extracting spatial feature data between a first electricity meter and a second electricity meter of the electricity meters from the associated data, wherein the spatial feature data includes spatial distribution data and spatial attribute data, the spatial distribution data representing distribution data for buildings and/or lands within spaces between the first electricity meter and the second electricity meter, the spatial attribute data representing land usage categories and/or classifications corresponding to the distribution data for buildings and/or lands;
- selecting one of a plurality of path loss models based on the spatial feature data between the first electricity meter and the second electricity meter to use the selected path loss model to estimate a path loss between the first electricity meter and the electricity meter; and
- estimating communication quality and connectivity between the first electricity meter and the second electricity meter based on the estimated path loss between the first electricity meter and the second electricity meter and determining whether to install the first electricity meter and the second electricity meter on the wireless network based on the communication quality and connectivity estimation result.

20. The electricity meter installation method as claimed in claim 19, wherein the step of associating the coordinate information of the electricity meters with the at least two types of map data to map the electricity meters to the corresponding position of the map data further comprises, for each of the electricity meters:
- analyzing whether the electricity meter is within a building according to the spatial attribute data;
- when the electricity meter is within the building, detecting the location of the road to which the electricity meter belongs according to the at least two types of map data; and
- moving the corresponding position of the electricity meter from the building to the edge of the location of the road to which the electricity meter belongs according to the detected location of the road to which the electricity meter belongs.

* * * * *